United States Patent
Samura

(10) Patent No.: US 8,631,167 B2
(45) Date of Patent: Jan. 14, 2014

(54) SYSTEM AND METHOD FOR REPRODUCTION CONTROL MEANS FOR AUTOMATICALLY REPRODUCING AUDIO TYPE DATA RECORDED IN USB DEVICE IN RESPONSE TO DETECTING MEANS

(75) Inventor: Yosuke Samura, Tokyo (JP)

(73) Assignee: Sony Corporation, Tokyo (JP)

( * ) Notice: Subject to any disclaimer, the term of this patent is extended or adjusted under 35 U.S.C. 154(b) by 539 days.

(21) Appl. No.: 12/644,599

(22) Filed: Dec. 22, 2009

(65) Prior Publication Data

US 2010/0180052 A1   Jul. 15, 2010

(30) Foreign Application Priority Data

Jan. 14, 2009   (JP) ................................. 2009-005493

(51) Int. Cl.
*G06F 3/00* (2006.01)

(52) U.S. Cl.
USPC .......... 710/15; 710/8; 710/9; 710/10; 710/16; 710/17; 710/18; 710/19; 710/72

(58) Field of Classification Search
USPC ..................... 710/8–10, 15–19, 72
See application file for complete search history.

(56) References Cited

U.S. PATENT DOCUMENTS

| 6,993,618 B2* | 1/2006 | Chen et al. ............... 710/305 |
| 7,203,777 B2* | 4/2007 | Morita et al. ............... 710/74 |
| 2002/0174286 A1 | 11/2002 | Tamura |
| 2009/0182935 A1* | 7/2009 | Pizzarulli et al. ............ 711/103 |

FOREIGN PATENT DOCUMENTS

| JP | 8-1614 | 11/1996 |
| JP | 2000-184006 | 6/2000 |
| JP | 3106234 | 9/2000 |
| JP | 2001-357359 | 12/2001 |
| JP | 2003-248534 | 9/2003 |
| JP | 2003-297010 | 10/2003 |
| JP | 2006-338287 | 12/2006 |
| JP | 2008-257755 | 10/2008 |
| WO | WO 2004/109676 A1 | 12/2004 |

OTHER PUBLICATIONS

Office Action issued Nov. 2, 2010, in Japan Patent Application No. 2009-005493.

* cited by examiner

*Primary Examiner* — Tammara Peyton
(74) *Attorney, Agent, or Firm* — Oblon, Spivak, McClelland, Maier & Neustadt, L.L.P.

(57) ABSTRACT

An information processing apparatus with a plurality of USB (universal serial bus) ports to which USB devices can be connected, includes: detection means for detecting the USB port of the plurality of USB ports to which the USB device that is in the course of data communication is connected; and first display control means for displaying on a display unit provided in a position corresponding to the detected USB port the fact that the USB device connected to the detected USB port is in the course of data communication.

13 Claims, 9 Drawing Sheets

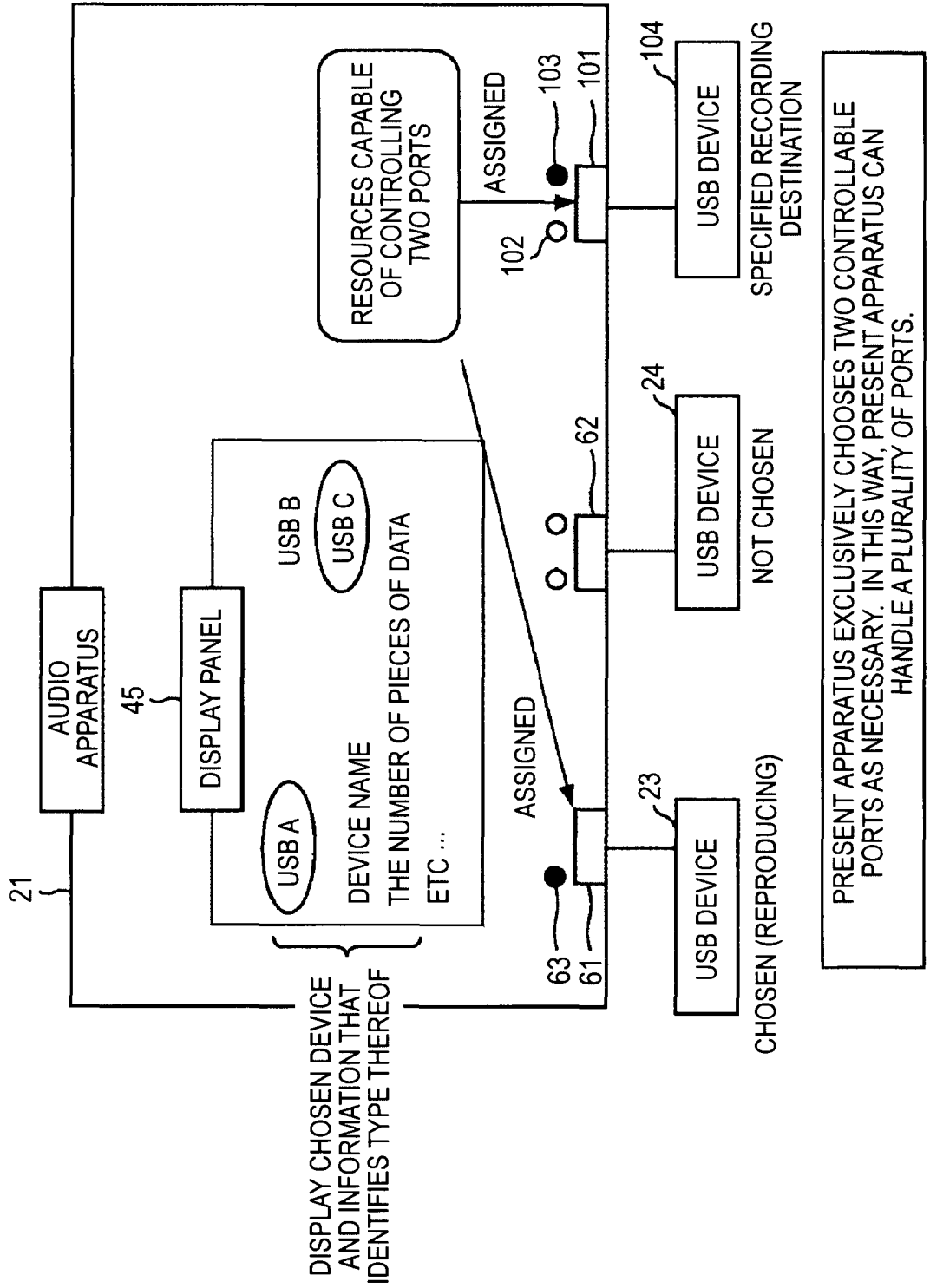

SYSTEM AND METHOD FOR REPRODUCTION CONTROL MEANS FOR AUTOMATICALLY REPRODUCING AUDIO TYPE DATA RECORDED IN USB DEVICE IN RESPONSE TO DETECTING MEANS

BACKGROUND OF THE INVENTION

1. Field of the Invention

The present invention relates to an information processing apparatus, an information processing method, and a program, and particularly to an information processing apparatus, an information processing method, and a program that allow a user to check more readily the state of a connected USB (universal serial bus) device.

2. Description of the Related Art

For example, a personal computer of related art is provided with USB ports to which USB devices can be connected in order to communicate data with the USB devices, such as a USB memory with a built-in nonvolatile recording medium and a portable player represented by a WALKMAN® (see JP-A-2000-348105 (Patent Document 1), for example).

SUMMARY OF THE INVENTION

The user using the personal computer of related art described above, however, is not able to readily check which USB port is connected to the USB device that is communicating data with the personal computer, what kind of process is being performed on the USB device connected to a particular USE port, and other states of the USB port and the respective USB device.

Thus, it is desirable to readily check the state of a USB port and a USB device connected thereto.

An embodiment of the invention is directed to an information processing apparatus with a plurality of USB ports to which USB devices can be connected or a program for controlling a computer in an information processing apparatus with a plurality of USB ports to which USB devices can be connected. The information processing apparatus includes detection means for detecting the USB port of the plurality of USB ports to which the USB device that is in the course of data communication is connected and first display control means for displaying on a display unit provided in a position corresponding to the detected USB port the fact that the USB device connected to the detected USB port is in the course of data communication, and the program causes the computer to function as the information processing apparatus.

The detection means may detect the USB port to which the USB device reproducing recorded data is connected and/or detect the USB port to which the USB device recording data is connected.

The first display control means may distinguish the detection of the USB port to which the USB device reproducing recorded data is connected from the detection of the USB port to which the USB device recording data is connected and displays the detection result on the display unit.

The information processing apparatus may further include control means for controlling a predetermined USB device based on an operation signal obtained by converting an operation signal for operating the information processing apparatus into an operation signal for operating the predetermined USB device, the predetermined USB device chosen from the USB devices connected to the USB ports and recognized as a predetermined type of USB device.

The control means may control the information processing apparatus based on the initial operation signal when the predetermined USB device is not chosen.

The information processing apparatus may further include second display control means for displaying information on the USB devices connected to the USB ports on a display panel.

The second display control means may display as the information on each of the USB devices at least one of the type of the USB device, the device name of the USB device, the number of pieces of data recorded in the USB device, and the hierarchical structure of the data recorded in the USB device.

The information processing apparatus may further include reproduction control means for controlling reproduction of data recorded in a predetermined USB device when the predetermined USB device is connected to any of the USB ports.

The information processing apparatus may further include recording control means for recording data recorded in a USB device connected to a predetermined USB port among the USB devices connected to the plurality of USB ports into the USB device connected to a USB port different from the predetermined USB port.

Another embodiment of the invention is an information processing method used in an information processing apparatus with a plurality of USB ports to which USB devices can be connected, the information processing apparatus including detection means and display control means, the method including the steps of causing the detection means to detect the USB port of the plurality of USB ports to which the USB device that is in the course of data communication is connected, and causing the display control means to display on a display unit provided in a position corresponding to the detected USB port the fact that the USB device connected to the detected USB port is in the course of data communication.

The embodiments of the invention allow the USB port of the plurality of USB ports to which the USB device that is in the course of data communication is connected to be detected and the fact that the USB device connected to the detected USB port is in the course of data communication to be displayed on a display unit provided in a position corresponding to the detected USB port.

The embodiments of the invention allow the state of the connected USB device to be readily checked.

BRIEF DESCRIPTION OF THE DRAWINGS

FIG. 9 shows an exemplary front view of the audio apparatus with three USB ports provided therein.

DESCRIPTION OF THE PREFERRED EMBODIMENTS

A mode for carrying out the invention (hereinafter referred to as embodiment) will be described below. The description will be made in the following order:
1. Embodiment
2. Variations <1. Embodiment>

[Exemplary Configuration of Audio Apparatus 21]

Figure 1:
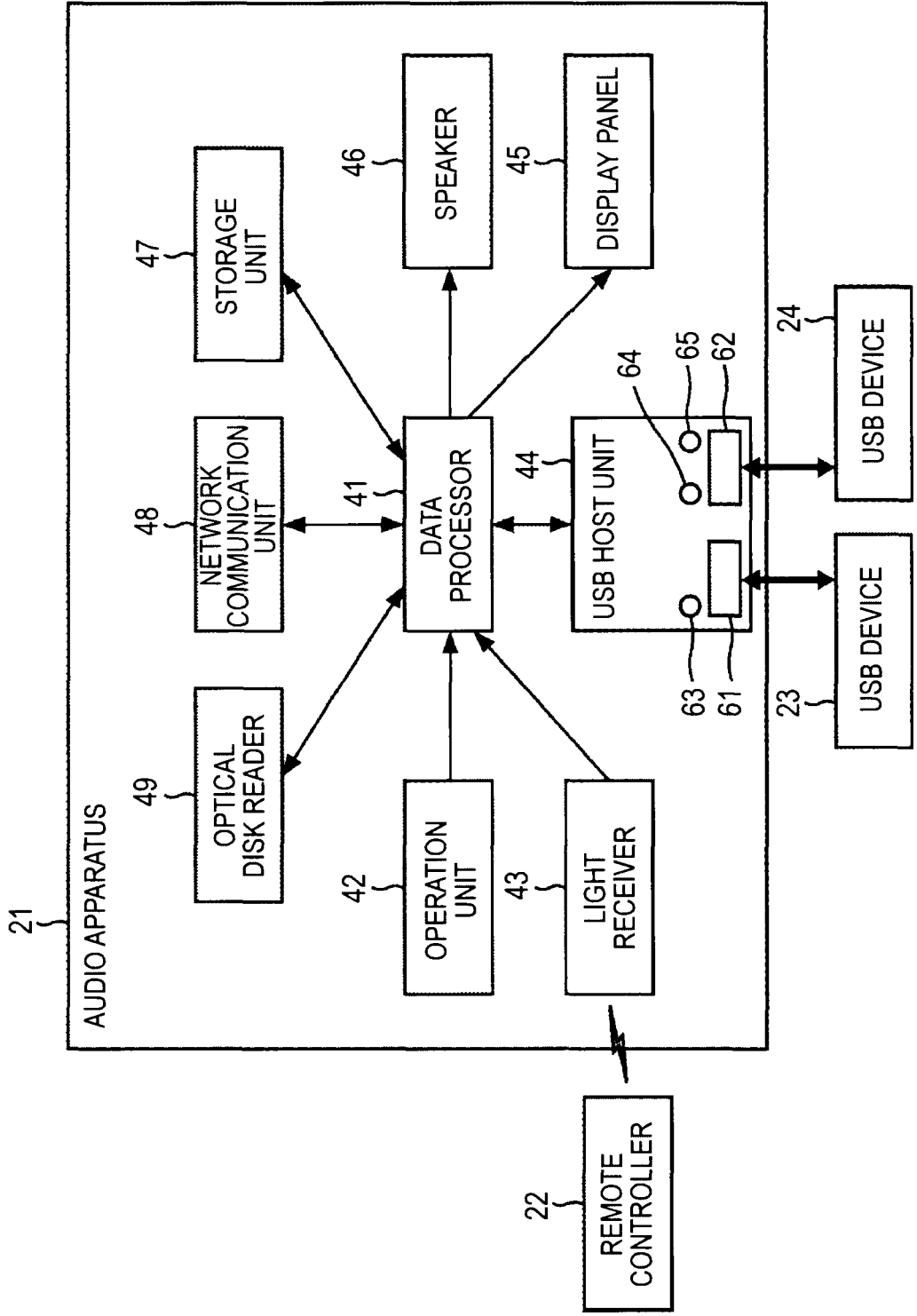
FIG. 1 is a block diagram showing an exemplary configuration of an audio apparatus to which is the invention is applied.

FIG. 1 shows an exemplary configuration of an audio apparatus 21, which is the embodiment of the invention.

The audio apparatus 21 reproduces predetermined music data recorded in a USB device 23 or a USB device 24 connected to the audio apparatus 21, records music data into the USB device 23 or the USB device 24, and performs other operations in accordance with an operation signal from a remote controller 22 or any other suitable component operated by a user or any other operator.

The audio apparatus 21 includes a data processor 41, an operation unit 42, a light receiver 43, a USB host unit 44, a display panel 45, a speaker 46, a storage unit 47, a network communication unit 48, and an optical disk reader 49.

The data processor 41 executes a program stored in advance in the storage unit 47 based on an operation signal or any other suitable signal from the operation unit 42 or the light receiver 43 to control the USB host unit 44, the display panel 45, the speaker 46, the storage unit 47, the network communication unit 48, the optical disk reader 49, and other components.

That is, for example, the data processor 41 supplies music data from the USB host unit 44 or the optical disk reader 49 to the speaker 46 to output (reproduce) the corresponding audio.

Alternatively, for example, the data processor 41 records music data into the USB device 23 or the USB device 24.

Still alternatively, for example, the data processor 41 supplies music data from the USB host unit 44 or the optical disk reader 49 to the storage unit 47 and stores the data therein.

The data processor 41 will be described later in detail with reference to FIG. 2.

The operation unit 42, for example, includes a recording button for instructing recording of music data from a connected USB device to another and a reproducing button for reproducing music data recorded in any of the USB devices.

The operation unit 42 is operated by the user or any other operator and supplies an operation signal according to the operation to the data processor 41.

The light receiver 43 receives an operation signal from the remote controller 22 and supplies it to the data processor 41.

The USB host unit 44, for example, includes USB ports 61 and 62 to which USB devices can be connected, reads predetermined data from the USB device 23 connected to the USB port 61 or the USB device 24 connected to the USB port 62, and supplies the data to the data processor 41.

The USB host unit 44 further includes a reproduction indicator lamp 63 provided in a position corresponding to (close to) the USB port 61, a reproduction indicator lamp 64 and a recording indicator lamp 65 provided in a position corresponding to the USB port 62.

The reproduction indicator lamp 63 lights up (or blinks), for example, in green when music data recorded in the USB device 23 connected to the USB port 61 is being reproduced. On the other hand, the reproduction indicator lamp 63 goes off when music data recorded in the USB device 23 connected to the USB port 61 is not being reproduced.

The reproduction indicator lamp 64 lights up (or blinks), for example, in green when music data recorded in the USB device 24 connected to the USB port 62 is being reproduced. On the other hand, the reproduction indicator lamp 64 goes off when music data recorded in the USB device 24 connected to the USB port 62 is not being reproduced.

The recording indicator lamp 65 lights up (or blinks), for example, in red when music data is being recorded in the USB device 24 connected to the USB port 62. On the other hand, the recording indicator lamp 65 goes off when no music data is being recorded into the USB device 24 connected to the USB port 62.

The display panel 45 is an LCD (liquid crystal display) or any other suitable component and displays, for example, information on the USB device 23 connected to the USB port 61 and the USE device 24 connected to the USB port 62. The display panel 45 is provided on the front side of the audio apparatus 21 where the USB port 61, the USB port 62, the reproduction indicator lamp 63, the reproduction indicator lamp 64, and the recording indicator lamp 65 in the USB host unit 44 are provided.

The speaker 46 outputs the sound (audio) corresponding to music data from the data processor 41.

The storage unit 47 is formed of a hard disk, a flash memory, or any other suitable component and stores (holds) in advance programs in accordance with which the data processor 41 carries out a variety of processes.

The storage unit 47 also stores in advance, for example, specific information (such as device drivers) necessary for the USB host unit 44 to recognize the USB devices connected to the USB ports 61 and 62.

Therefore, unlike a personal computer or any other similar apparatus that operates in accordance with a general-purpose operating system, using a USB device does not typically require installation of specific information necessary to recognize the USB device.

Since the user does not need to perform any operation of installing specific information necessary to recognize a USB device, a user who does not have enough knowledge about a computer or other similar apparatus can use the audio apparatus 21, for example, to read data readily from the USB device 23, the USB device 24, and other components.

The storage unit 47 also stores music data from the data processor 41.

The network communication unit 48, which is connected to the Internet or other networks, communicates with a server or any other similar apparatus that holds music data, downloads the music data therefrom, and supplies the music data to the data processor 41.

A CD (compact disc) or any other similar medium on which music data are recorded can be inserted into the optical disk reader 49. The optical disk reader 49 reads the music data recorded on the inserted CD or any other similar medium and supplies the music data to the data processor 41.

[Exemplary Configuration of Data Processor 41]

Figure 2:
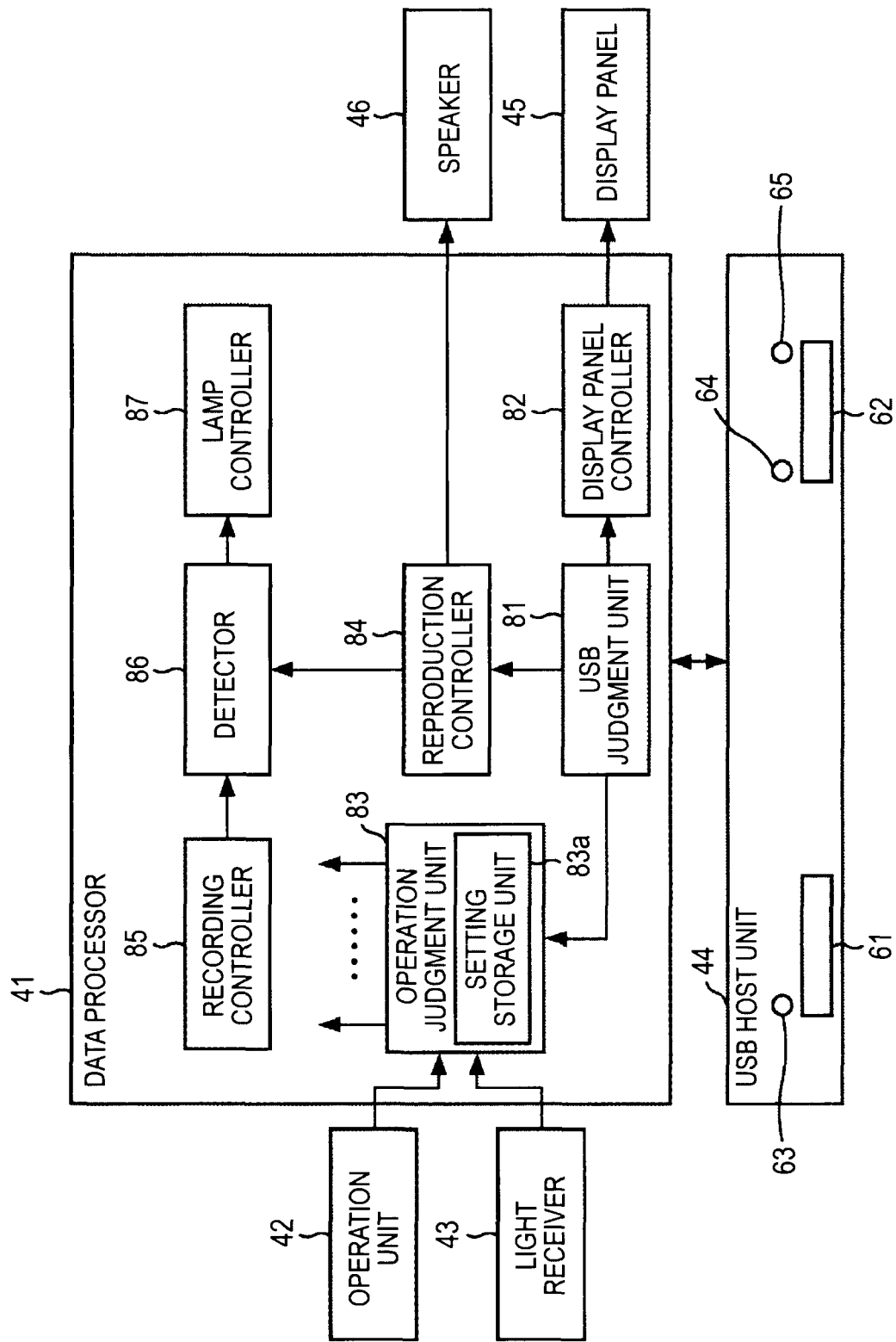
FIG. 2 is a block diagram showing an exemplary functional configuration of a data processor.

FIG. 2 shows an exemplary detailed configuration of the data processor 41.

The data processor 41 primarily includes a USB judgment unit 81, a display panel controller 82, an operation judgment unit 83 including a setting storage unit 83a, a reproduction controller 84, a recording controller 85, a detector 86, and a lamp controller 87.

When a USB device is connected to the USB port 61 or the USB port 62 in the USB host unit 44, the USB judgment unit 81 reads information used to identify the type of USB device, the number of pieces of data recorded in the USB device, and other information from the USB device, and supplies the thus read information as display information to the display panel controller 82.

When a USB device is connected to the USB port 61 or the USB port 62 and the connected USB device is chosen in response to the connection, or when the user performs a certain operation to choose or otherwise specify either of the connected USB devices, the USB judgment unit 81 judges whether the type of the chosen USB device corresponds to AUC (audio class) represented by an iPod® or MSC (mass storage class) represented by a WALKMAN® based on the read information used to identify the type of USB device. The thus obtained judgment result is then supplied to the operation judgment unit 83 and the reproduction controller 84.

The display panel controller 82 displays characters or any other indications corresponding to the display information from the USB judgment unit 81 on the display panel 45.

The operation judgment unit 83 includes the setting storage unit 83a. The setting storage unit 83a holds key setting information used to judge whether an operation signal from the operation unit 42 or the light receiver 43 is recognized (identified) as an operation signal for operating the audio apparatus 21 or an operation signal for operating the chosen USB device.

The operation judgment unit 83 updates the key setting information held in the setting storage unit 83a based on the judgment result from the USB judgment unit 81.

The operation judgment unit 83 recognizes an operation signal from the operation unit 42 or the light receiver 43 as an operation signal for operating the audio apparatus 21 or an operation signal for operating the chosen USB device based on the key setting information stored in the setting storage unit 83a.

When the operation judgment unit 83 has recognized that an operation signal from the operation unit 42 or the light receiver 43 is an operation signal for operating the audio apparatus 21, the operation judgment unit 83 controls the audio apparatus 21 (the reproduction controller 84, the recording controller 85, or any other component) in accordance with the operation signal.

When the operation judgment unit 83 has recognized that an operation signal from the operation unit 42 or the light receiver 43 is an operation signal for operating a USB device, the operation judgment unit 83 converts the operation signal into an operation signal for operating the chosen USB device. The operation judgment unit 83 then controls the chosen USB device in accordance with the converted operation signal.

When the judgment result from the USB judgment unit 81 shows that the type of the chosen USB device corresponds to AUC, the reproduction controller 84 reads music data from the chosen USB device. The reproduction controller 84 then supplies the thus read music data to the speaker 46 so that the corresponding audio is outputted.

When the judgment result from the USB judgment unit 81 shows that the type of the chosen USB device corresponds to MSC, the reproduction controller 84 waits in a reproducible state in which music data can be promptly reproduced from the chosen USB device in response to a user's operation that instructs reproduction.

Further, the reproduction controller 84 supplies the detector 86 as appropriate with reproduction information indicating whether or not the USB device 23 connected to the USB port 61 or the USB device 24 connected to the USB port 62 is reproducing music data recorded therein.

The recording controller 85, for example, controls the recording of music data from the USB device 23 connected to the USB port 61 into the USB device 24 connected to the USB port 62.

The recording controller 85 supplies the detector 86 as appropriate with recording information indicating whether or not music data is being recorded into the USB device 24.

The detector 86 detects the USB port to which the USB device reproducing recorded music data is connected based on the reproduction information from the reproduction controller 84, and supplies the thus obtained detection result to the lamp controller 87.

The detector 86 detects the USB port 62 to which the USB device 24 recording music data is connected based on the recording information from the recording controller 85, and supplies the thus obtained detection result to the lamp controller 87.

The reproduction information contains information used to identify the USE port to which the USB device reproducing recorded music data is connected, whereas the recording information contains information used to identify the USB port 62 to which the USB device 24 recording music data is connected.

The lamp controller 87 controls the display state of the reproduction indicator lamp 63, the reproduction indicator lamp 64, and the recording indicator lamp 65 (so that they light up or go off) based on the detection result from the detector 86.

[First Exemplary Exterior Appearance of Audio Apparatus 21]

Figure 3:
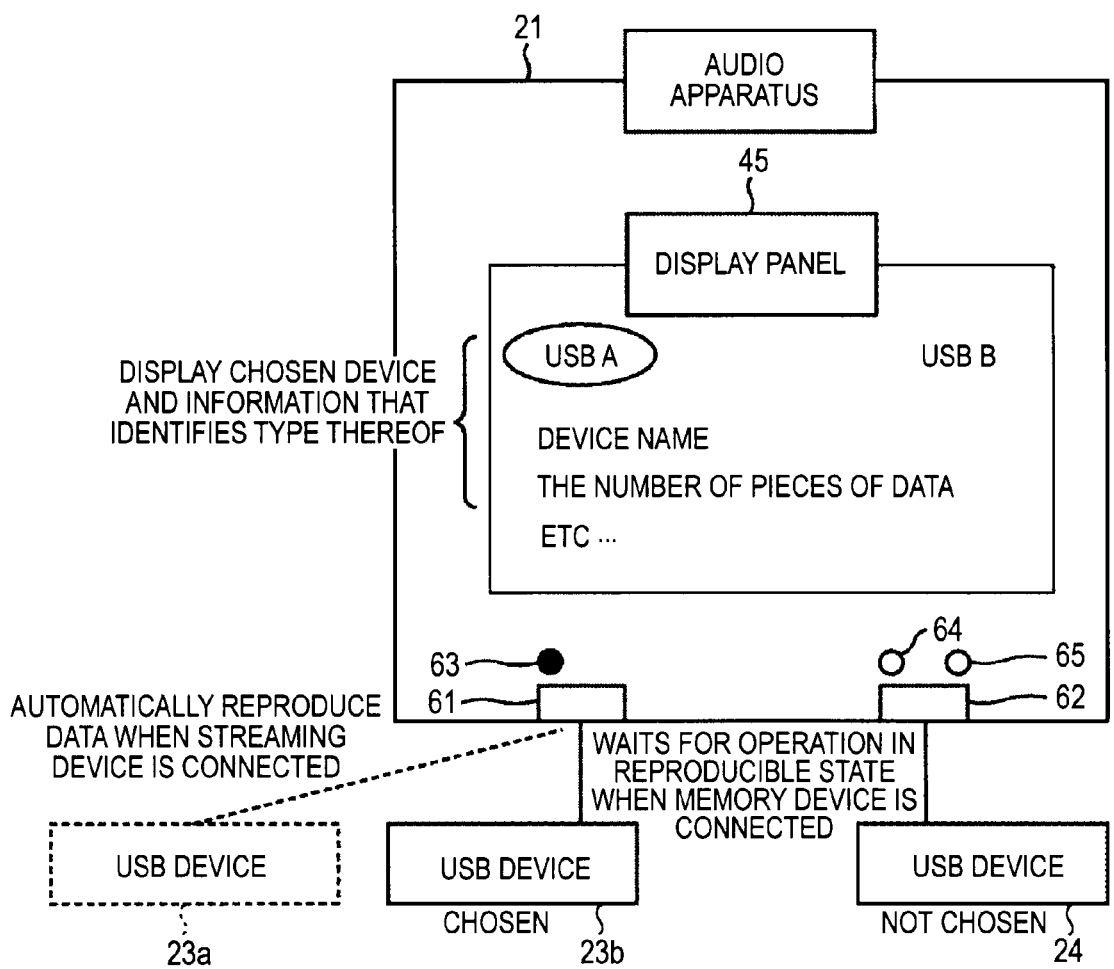
FIG. 3 shows an exemplary front view of the audio apparatus when music data recorded in a USB device is being reproduced.

FIG. 3 shows an example of how the audio apparatus 21 viewed from the front (for example, when one looks at the surface opposite the surface to which an AC plug is connected) looks like when the USB device 23 is connected to the USB port 61.

As shown in FIG. 3, the display panel 45 is provided on the front side of the audio apparatus 21, and the two USB ports 61 and 62 to which USB devices can be connected are provided in a lower portion of the display panel 45.

In the following description, the USB device 23 connected to the USB port 61 and corresponding to AUC (streaming device) is called a USB device 23a, and the USB device 23 connected to the USB port 61 and corresponding to MSC (memory device) is called a USB device 23b.

When it is not necessary to distinguish the USB device 23a and the USB device 23b from each other, they are simply called USB devices 23.

For example, when the USB device 23a corresponding to AUC is connected to the USB port 61 and chosen in response to the connection, the reproduction controller 84 reads music data recorded in the USB device 23a and automatically reproduces the music data, as shown in FIG. 3.

Alternatively, for example, when the USB device 23b corresponding to MSC is connected to the USB port 61 and chosen in response to the connection, the reproduction controller 84 waits in the reproducible state in which music data recorded in the USB device 23b can be promptly reproduced in response to a user's operation that instructs reproduction. The reproduction controller 84 then reproduces the music data in response to the user's operation that instructs reproduction.

Further, when the reproduction controller 84 reproduces the music data recorded in the USB device 23, the reproduction controller 84 supplies the detector 86 with reproduction information indicating that the music data is being reproduced.

The detector 86 detects the USB port 61 to which the USB device 23 reproducing recorded music data is connected based on the reproduction information from the reproduction controller 84, and supplies the detection result to the lamp controller 87. The lamp controller 87 turns on the reproduction indicator lamp 63 provided in a position corresponding to (close to) the USB port 61 based on the detection result from the detector 86, as shown in FIG. 3.

The procedure described above applies to, for example, a case where the USB device 24 is connected to the USB port 62.

When the USB device 23 is connected to the USB port 61 and chosen in response to the connection, the display panel 45 displays the following information in a left portion of the display panel 45 in FIG. 3: the characters "USB A" representing the USB port 61, the type of the USB device 23 (AUC or MSC) connected to the USB port 61 or the device name registered in advance by the user ("WALKMA®," for example), the number of pieces of music data recorded in the USB device 23 ("5 folders" when the number of music data folders is 5, for example), the hierarchical structure of the music data recorded in a hierarchical manner, and other information on the USB device 23.

When the USB device 24 or any other component is connected to the USB port 62, the display panel 45 displays the device name of the USB device 24 and other information, as in the case where the USB device 23 is connected to the USB port 61.

[Second Exemplary Exterior Appearance of Audio Apparatus 21]

Figure 4:
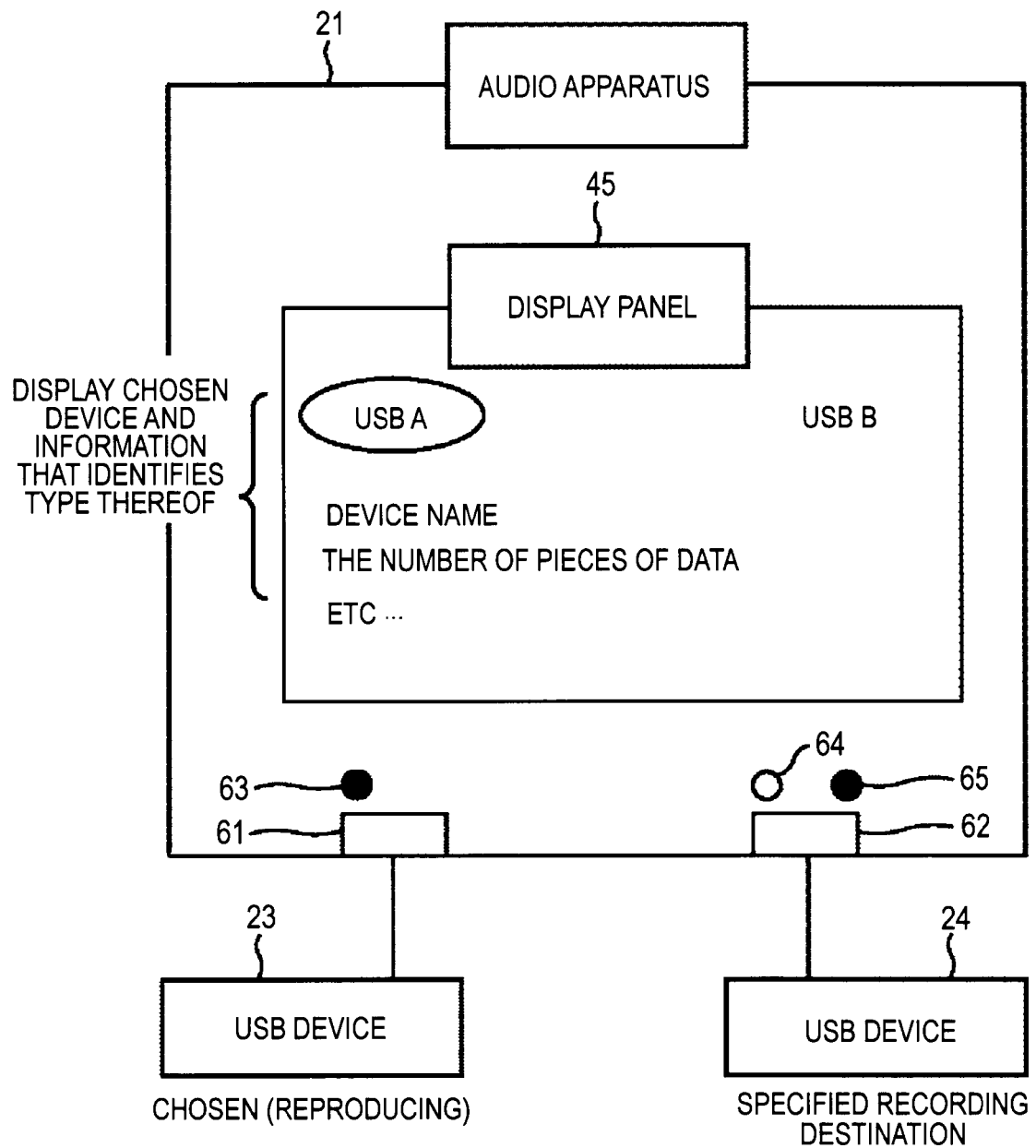
FIG. 4 shows an exemplary front view of the audio apparatus when music data is being recorded into a USB device.

FIG. 4 shows an example of how the audio apparatus 21 viewed from the front looks like when predetermined music data recorded in the USB device 23 connected to the USB port 61 is being recorded into the USB device 24 connected to the USB port 62.

The portions common to those in FIG. 3 have the same reference characters, and no description thereof will be made below.

The recording controller 85 instructs the USB device 24 to record predetermined music data recorded in the USB device 23 (music data being reproduced, for example) in response to, for example, a user's operation that instructs recording. The recording controller 85 supplies the detector 86 with recording information indicating that the music data is being recorded.

In this process, the detector 86 detects the USB port 62 based on the recording information from the recording controller 85, and supplies the detection result to the lamp controller 87. The lamp controller 87 then turns on the recording indicator lamp 65 provided in a position corresponding to the USB port 62 based on the detection result from the detector 86, as shown in FIG. 4.

[Description of Operation in Reproduction Control Process]

Figure 5:
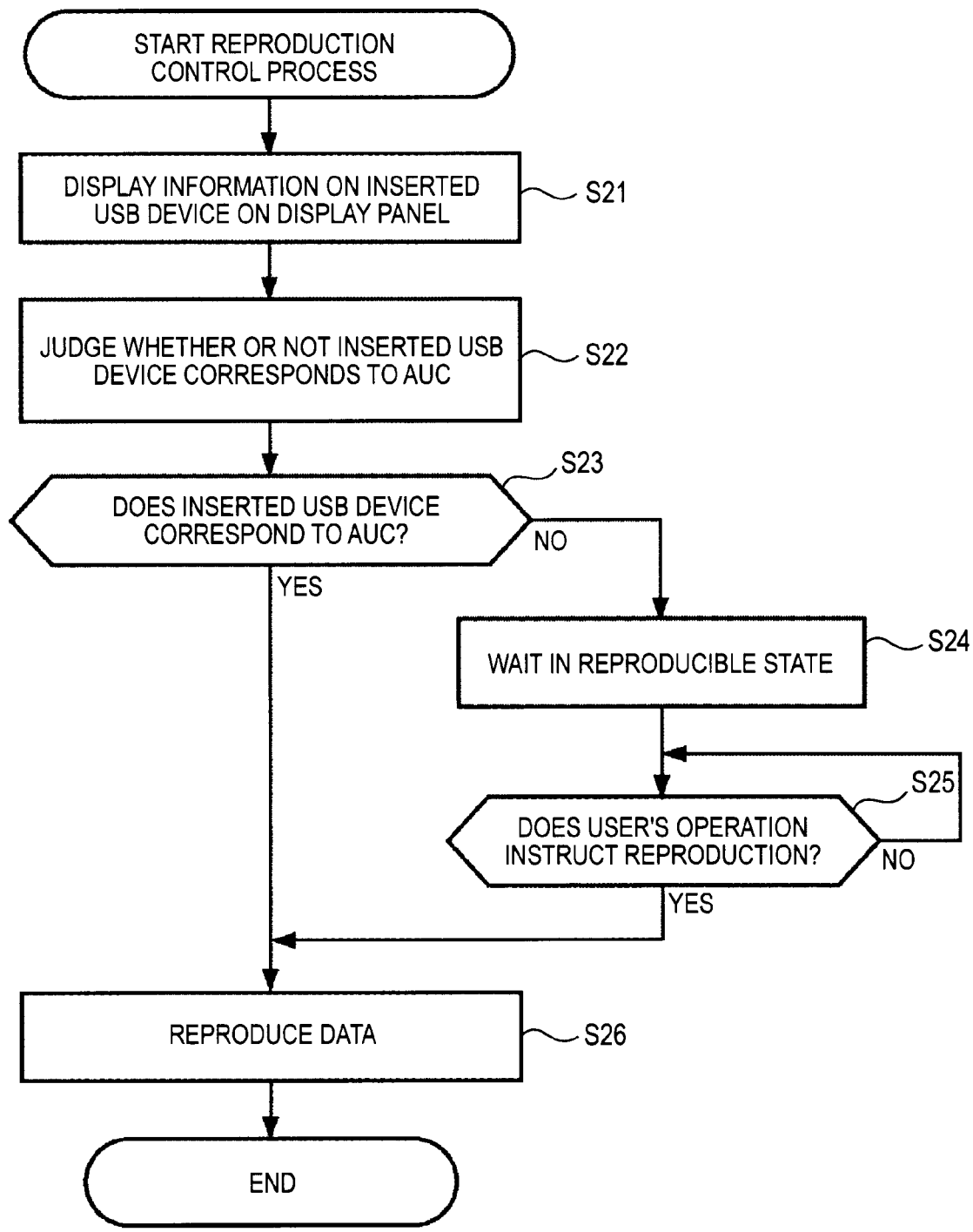
FIG. 5 is a flowchart for describing a reproduction control process.

A description will be made of a reproduction control process performed by the audio apparatus 21, for example, when the USB device 23 is connected to the USB port 61 with reference to the flowchart in FIG. 5.

The reproduction control process will be described only in a case where the USB device 23 is connected to the USB port 61, and the reproduction control processes in other cases will not be described because the reproduction control process performed when the USB device 24 or any other component is connected to the USB port 62 is the same as that performed when the USB device 23 is connected to the USB port 61.

The reproduction control process is initiated, for example, when the USB device 23 is connected to the USB port 61.

In the step S21, when the USB device 23 is connected to the USB port 61 and chosen in response to the connection, the USB judgment unit 81 reads from the USB device 23 information used to identify the type of the USB device 23, the number of pieces of data recorded in the USB device 23, and other information on the USB device 23 and supplies the read information as display information to the display panel controller 82. The display panel controller 82 displays characters or any other indications corresponding to the display information from the USB judgment unit 81 on the display panel 45.

In the step S22, the USB judgment unit 81 judges whether the type of the USB device 23 connected to the USB port 61 in the USB host unit 44 corresponds to AUC (audio class) or MSC (mass storage class) based on the information read from the USB device 23 and used to identify the type of USB device. The USB judgment unit 81 then supplies the thus obtained judgment result to the reproduction controller 84.

In the step S23, when the reproduction controller 84 receives from the USB judgment unit 81a judgment result indicating that the type of the USB device 23 corresponds to MSC, the control proceeds to the step S24.

In the step S24, the reproduction controller 84 waits in the reproducible state in which music data can be promptly reproduced from the chosen USE device 23 in response to a user's operation that instructs reproduction.

In the step S25, the reproduction controller 84 waits in the reproducible state until a user's operation instructs reproduction, and the control proceeds to the step S26 in response to the reproduction instruction.

In the step S23, when the reproduction controller 84 receives from the USB judgment unit 81a judgment result indicating that the type of the USB device 23 connected to the USB port 61 corresponds to AUC, the control proceeds to the step S26. The reproduction controller 84 then reads music data from the chosen USB device 23, and supplies the music data to the speaker 46 so that the corresponding audio is outputted.

As described above, for example, in the reproduction control process, since the device name of the chosen USE device 23, the number of pieces of data recorded in the USB device 23, and other information on the USB device 23 are displayed on the display panel 45, the user can readily know the information on the chosen USB device 23.

Further, in the reproduction control process, since the reproduction controller 84 automatically reproduces music data when the type of the chosen USB device 23 corresponds to AUC, whereas the reproduction controller 84 waits in the reproducible state in which music data can be promptly reproduced in response to a user's operation when the type of the chosen USB device 23 corresponds to MSC, the user can perform an appropriate action in accordance with the type of the chosen USB device 23.

[Description of Operation in Lamp Display Process]

Figure 6:
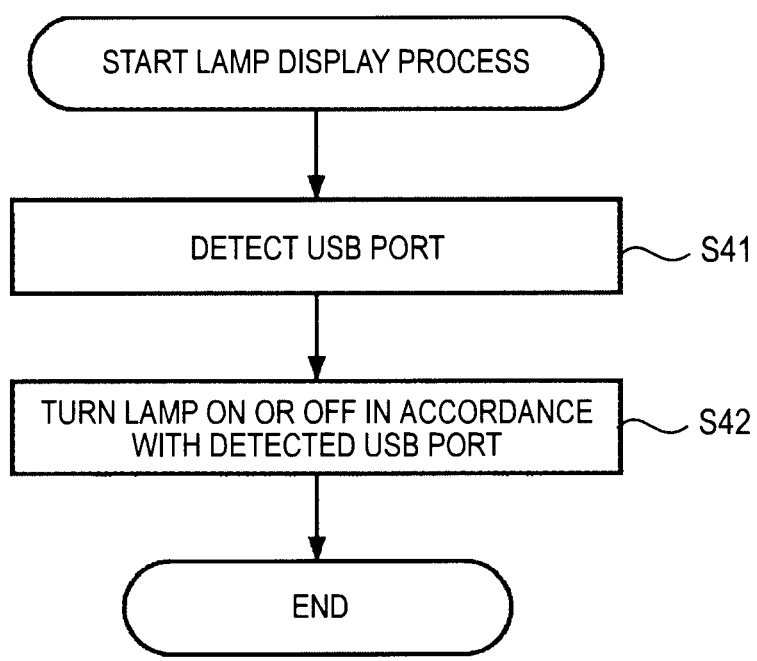
FIG. 6 is a flowchart for describing a lamp display process.

A description will be made of a lamp display process with reference to FIG. 6 in which the USB port to which a USB device is connected, the USB port 61 or 62, is detected and the reproduction indicator lamp 63, for example, is controlled to light up or go off based on the detection result.

In the step S41, the detector 86 detects the USB port to which the USB device reproducing recorded music data is connected based on the reproduction information from the reproduction controller 84 and supplies the thus obtained detection result to the lamp controller 87.

Further, the detector 86 detects the USB port to which the USB device recording music data is connected based on the recording information from the recording controller 85 and supplies the thus obtained detection result to the lamp controller 87.

In the step S42, the lamp controller 87 controls the display state of the reproduction indicator lamp 63, the reproduction indicator lamp 64, and the recording indicator lamp 65 based on the detection result from the detector 86.

That is, for example, when the lamp controller 87 receives from the detector 86 a detection result indicating that the USB device 23 reproducing recorded music data is connected to the USB port 61, the reproduction indicator lamp 63 lights up.

On the other hand, for example, when the lamp controller 87 receives from the detector 86 a detection result indicating that the USB device 23 reproducing no recorded music data is connected to the USB port 61, the reproduction indicator lamp 63 goes off.

Further, for example, when the lamp controller 87 receives from the detector 86 a detection result indicating that the USB device 24 reproducing recorded music data is connected to the USB port 62, the reproduction indicator lamp 64 lights up.

On the other hand, for example, when the lamp controller 87 receives from the detector 86 a detection result indicating that the USB device 24 reproducing no recorded music data is connected to the USB port 62, the reproduction indicator lamp 64 goes off.

Further, when the lamp controller 87 receives from the detector 86 a detection result indicating that the USB device 24 recording predetermined music data recorded in the USB device 23 is connected to the USB port 62, the recording indicator lamp 65 lights up.

On the other hand, when the lamp controller 87 receives from the detector 86 a detection result indicating that the USB device 24 recording no predetermined music data recorded in the USB device 23 is connected to the USB port 62, the recording indicator lamp 65 goes off.

As described above, in the lamp display process, the reproduction indicator lamp 63, the reproduction indicator lamp 64, the recording indicator lamp 65, and other components light up and go off in accordance with the detection result from the detector 86.

The user can therefore readily know the state of each of the USB devices 23 and 24 in an intuitive manner, that is, which of the USB devices is reproducing music data recorded therein or which of the USB devices is recording music data.

In the lamp display process, in correspondence to the USB device, for example, reproducing recorded music data or recording music data, the reproduction indicator lamp or the recording indicator lamp provided in a position corresponding to the USB port to which the USB device is connected lights up.

The reproduction indicator lamp or recording indicator lamp that lights up therefore allows the user to readily identify the USB device, for example, reproducing recorded music data or recording music data.

Therefore, the audio apparatus 21 prevents the user from performing a wrong operation, for example, accidentally disconnecting from the USB port 61 the USB device 23 in the course of data communication with the audio apparatus 21 to reproduce recorded music data.

[Third Exemplary Exterior Appearance of Audio Apparatus 21]

Figure 7:
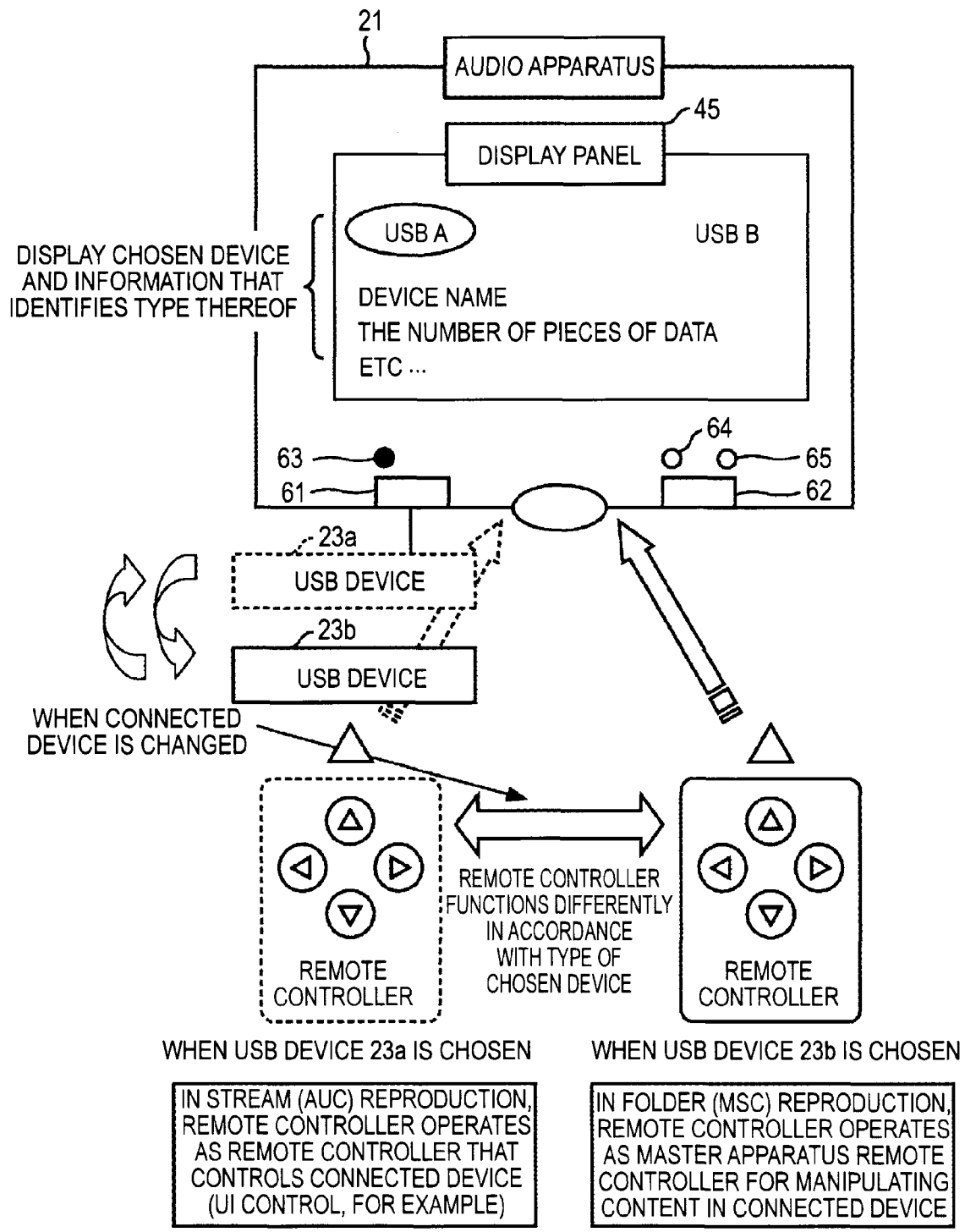
FIG. 7 describes that the object to be operated by a remote controller is changed in accordance with the connected USB device.

FIG. 7 shows that the object to be operated by an operation signal from the remote controller 22 is changed in accordance with the type of the USB device 23 connected to the USB port 61.

The portions common to those in FIG. 3 have the same reference characters, and no description thereof will be made below.

For example, when a USB device corresponding to AUC is chosen, the audio apparatus 21 recognizes an operation signal from the remote controller 22 as an operation signal for operating the chosen USB device.

That is, for example, when the USB device 23*a* corresponding to AUC is connected to the USB port 61 and chosen in response to the connection, the audio apparatus 21 recognizes an operation signal from the remote controller 22 as an operation signal for operating the USB device 23*a*, as shown in FIG. 7.

In this case, the remote controller 22 operates as a remote controller for operating the USB device 23*a* connected to the USB port 61.

On the other hand, for example, when a USB device corresponding to AUC is not chosen, the audio apparatus 21 recognizes an operation signal from the remote controller 22 as an operation signal for operating the audio apparatus 21 itself.

That is, for example, when the USB device 23*b* corresponding to MSC is connected to the USB port 61 and chosen in response to the connection, the audio apparatus 21 recognizes an operation signal from the remote controller 22 as an operation signal for operating the audio apparatus 21 itself, as shown in FIG. 7.

In this case, the remote controller 22 operates as a remote controller for operating the audio apparatus 21 itself.

[Description of Operation in Key Assignment Process]

Figure 8:
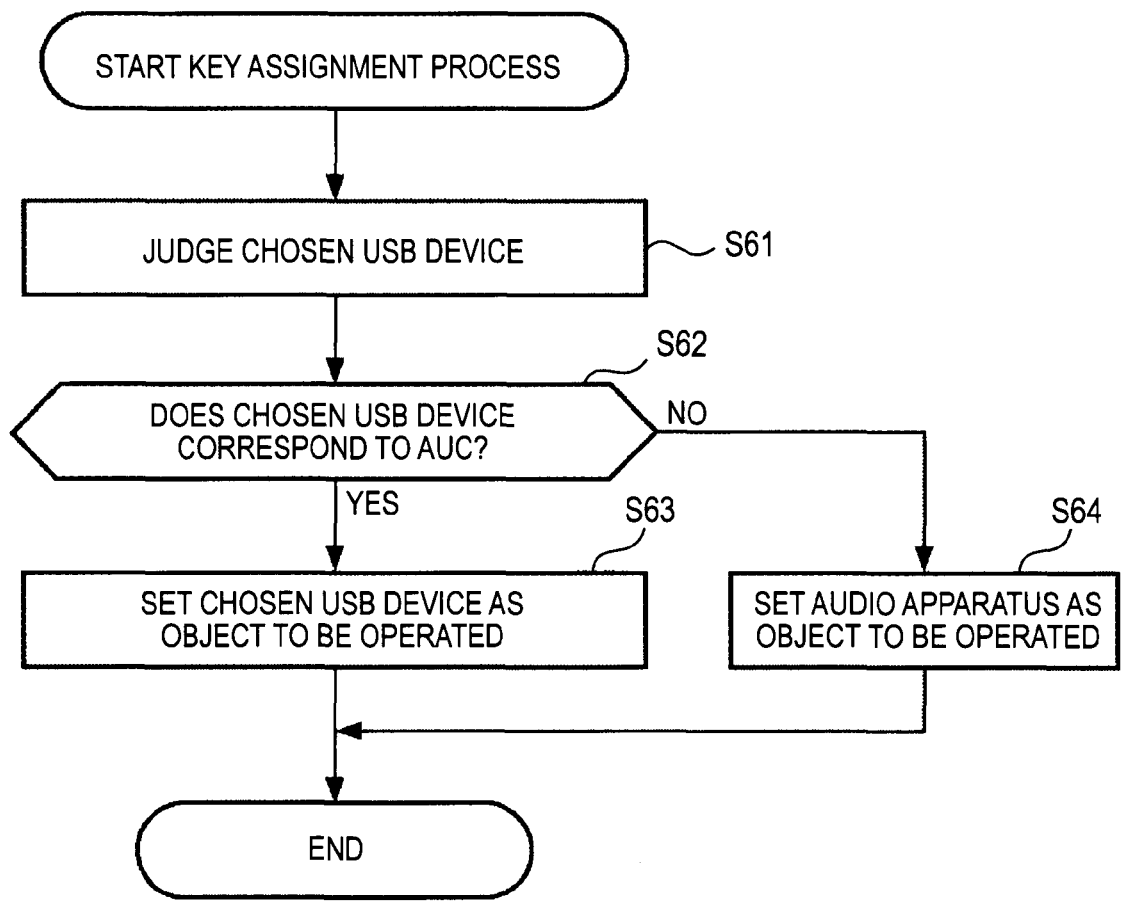
FIG. 8 is a flowchart for describing a key assignment process.

A description will be made of a key assignment process with reference to the flowchart in FIG. 8 in which the object to be operated by the remote controller 22 is changed in accordance with the chosen USB device.

The key assignment process is initiated, for example, when the USB device 23*a* corresponding to AUC or the USB device 23*b* corresponding to MSC is connected to the USB port 61 and the connected USB device is chosen in response to the connection, or when a USB device is chosen by a user's operation.

In the step S61, the USB judgment unit 81 reads from the chosen USB device information used to identify the type of USB device. The USB judgment unit 81 then judges based on the thus read information used to identify the type of USE device whether the type of the chosen USB device corresponds to AUC or MSC, and supplies the thus obtained judgment result to the operation judgment unit 83.

In the step S62, when the USB judgment unit 81 judges that the chosen USB device corresponds to AUC, the control proceeds to the step S63. In the step S63, the operation judgment unit 83 updates the key setting information stored in the setting storage unit 83*a* based on the judgment result from the USB judgment unit 81 so that the object to be operated by the remote controller 22 is the chosen USB device.

In the step S62, when the USB judgment unit 81 judges that the chosen USB device does not correspond to AUC (but MSC), the control proceeds to the step S64. In the step S64, the operation judgment unit 83 updates the key setting information stored in the setting storage unit 83*a* based on the judgment result from the USB judgment unit 81 so that the object to be operated by the remote controller 22 is the audio apparatus 21.

The key assignment process is then terminated.

As described above, in the key assignment process, the object to be operated by the remote controller 22 is changed to the chosen USB device or the audio apparatus 21 in accordance with the type of the chosen USB device.

The user can therefore use the remote controller 22 to operate not only the audio apparatus 21 but also a chosen USB device without considering the remote controller 22 as that dedicated to the audio apparatus 21. The convenience provided by the remote controller 22 can thus be enhanced.

<2. Variations>

In the key assignment process, the audio apparatus 21 recognizes an operation signal from the remote controller 22 as an operation signal for operating the chosen USB device or an operation signal for operating the audio apparatus 21 in accordance with the type of the chosen USB device in the above description. Alternatively, an operation signal itself outputted from the remote controller 22 may be changed.

That is, for example, the audio apparatus 21 may inform the remote controller 22 of device information indicating whether or not the chosen USB device corresponds to AUC, and the remote controller 22 may change an operation signal to be outputted to the audio apparatus 21 to an operation signal for operating the USB device or an operation signal for operating the audio apparatus 21 based on the device information from the audio apparatus 21.

In the embodiment of the invention, the reproduction indicator lamp 64, for example, is provided to indicate whether or not music data is being reproduced, and the recording indicator lamp 65, for example, is separately provided to indicate whether or not music data is being recorded. Alternatively, any other suitable component may be provided to indicate whether or not music data is being reproduced and whether or not music data is being recorded.

That is, for example, the reproduction indicator lamp 64 and the recording indicator lamp 65 may be replaced with a single lamp that, for example, lights up in different colors or blinks at different speeds to function as a reproduction indicator lamp or a recording indicator lamp.

In the above description, the recording indicator lamp 65 lights up when music data is being recorded from the USB device 23 connected to the USB port 61 into the USB device 24 connected to the USB port 62. Alternatively, for example, in addition to or in place of the recording indicator lamp 65, an arrow or any other suitable sign indicating that music data is being recorded from the USB device 23 into the USB device 24 may be displayed.

Further, for example, in addition to the recording indicator lamp 65, a lamp that lights up to indicate that the USB device 23 is the source from which music data is provided may be provided in a position corresponding to the USB device 23.

In the embodiment of the invention, the reproduction indicator lamp and the recording indicator lamp are employed, for example, to indicate the state of a USB device, but any other lamps may be employed. For example, a lamp that lights up when a USB device is ready to reproduce data, a lamp that lights up when predetermined data is not recorded, and a lamp that lights up when the memory capacity of a USB device is smaller than a predetermined threshold may be provided.

Further, in the embodiment of the invention, the display panel 45 displays information on a chosen USB device. Alternatively, for example, the display panel 45 may display information on all USB devices connected to the USB ports.

In the embodiment of the invention, the USB device 23 (or the USB device 24) connected to the USB port 61 (or the USB port 62) has been described as either a USB device corresponding to AUC or a USB device corresponding to MSC. Alternatively, a USB device connected to any of the USB ports may be a USB device having a plurality of USB classes, such as AUC and MSC, (a USB device corresponding to a plurality of USB classes).

In this case, a USB device corresponding to a plurality of USB classes operates as a USB device corresponding to AUC when the audio apparatus 21 recognizes that the USB device corresponds to AUC, whereas operating as a USB device corresponding to MSC when the audio apparatus 21 recognizes that the USB device corresponds to MSC.

The invention is applicable to not only the audio apparatus 21 and other apparatus that reproduces, records, or otherwise handles music data but also an information processing apparatus that reproduces, records, or otherwise handles video data, text data, and other content.

In the embodiment of the invention, the USB ports provided in the USB host unit 44 are only the two USB ports 61 and 62. Alternatively, the number of USB ports can be three or greater.

[Fourth Exemplary Exterior Appearance of Audio Apparatus 21]

FIG. 9 shows an exemplary configuration of the audio apparatus 21 with three USB ports provided therein.

The portions common to those in FIG. 3 have the same reference characters, and no description thereof will be made below.

That is, the configuration shown in FIG. 9 is similar to that shown in FIG. 3 except that a USB port 101, a reproduction indicator lamp 102, and a recording indicator lamp 103 are newly provided.

A USB device 104 or any other device is connected to the USB port 101.

The reproduction indicator lamp 102 is provided in a position corresponding to the USB port 101 and lights up or goes off in accordance with whether or not the USB device 104 connected to the USB port 101 is reproducing music data.

The recording indicator lamp 103 is provided in a position corresponding to the USB port 101 and lights up or goes off in accordance with whether or not the USB device 104 connected to the USB port 101 is recording music data.

To record music data into a USB device, USB device control resources are allocated, for example, only to the USB port 61 and the USB port 101 to which the two USB devices 23 and 104 chosen by a user's operation are connected, as shown in FIG. 9. Music data are then recorded from the USB device 23 into the USB device 104.

Therefore, even when three or more USB ports are provided in the audio apparatus 21, resources for controlling only two USB devices are necessary, as in the case where two USB ports are provided. As a result, the manufacturing cost can be reduced as compared to, for example, an audio apparatus in which resources are allocated to all USB ports.

In the present specification, the steps describing the reproduction control process, the lamp display process, and the key assignment process include not only, of course, processes performed in time series in the described order but also processes performed not necessarily in time series but concurrently or individually.

Embodiment of the invention is not limited to the embodiment described above, but a variety of changes can be made thereto to the extent that they do not depart from the spirit of the invention.

The present application contains subject matter related to that disclosed in Japanese Priority Patent Application JP 2009-005493 filed in the Japan Patent Office on Jan. 14, 2009, the entire contents of which is hereby incorporated by reference.

What is claimed is:

1. An information processing apparatus with a plurality of USB (universal serial bus) ports to which USB devices can be connected, the information processing apparatus comprising:

detection means for detecting the USB port of the plurality of USB ports to which the USB device that is in a course of data communication is connected, and for determining whether the USB device is one of an audio class type and a mass storage class type;

reproduction control means for automatically reproducing data recorded in the USB device in response to the detecting means determining that the USB device is of the audio class type, the reproduction control means automatically reproducing the data independent of a user input operation;

first display control means for displaying on a display unit, provided in a position corresponding to the detected USB port, that the USB device connected to the detected USB port is in the course of data communication; and second display control means for displaying information on each of the USB devices connected to the USB ports on a display panel, the information being displayed including whether each of the USB devices is one of the audio class type and the mass storage class type,
a device name of each of the USB devices,
a number of pieces of data recorded in each of the USB devices, and
a hierarchical structure of the data recorded in each of the USB devices.

2. The information processing apparatus according to claim 1,
wherein the detection means detects one of the USB port to which the USB device reproducing recorded data is connected and the USB port to which the USB device recording data is connected.

3. The information processing apparatus according to claim 2,
wherein the first display control means distinguishes the detection of the USB port to which the USB device reproducing recorded data is connected from the detection of the USB port to which the USB device recording data is connected and displays the detection result on the display unit.

4. The information processing apparatus according to claim 1,
further comprising control means for controlling a predetermined USB device based on an operation signal obtained by converting an operation signal for operating the information processing apparatus into an operation signal for operating the predetermined USB device, the predetermined USB device chosen from the USB devices connected to the USB ports and recognized as a predetermined type of USB device.

5. The information processing apparatus according to claim 4,
wherein the control means controls the information processing apparatus based on the initial operation signal when the predetermined USB device is not chosen.

6. The information processing apparatus according to claim 1,
wherein the reproduction control means automatically reproduces the data recorded in the USB device when the USB device is connected to any of the USB ports.

7. The information processing apparatus according to claim 1,
further comprising recording control means for recording the data recorded in the USB device, which is connected to a predetermined USB port among the USB devices connected to the plurality of USB ports, into another USB device connected to a USB port different from the predetermined USB port.

8. An information processing method used in an information processing apparatus with a plurality of USB ports to which USB devices can be connected,
the information processing apparatus including
detection means,
reproduction control means,
first display control means, and
second display control means,
the information processing method comprising the steps of:
detecting, using the detection means, the USB port of the plurality of USB ports to which the USB device that is in a course of data communication is connected;
determining, using the detection means, whether the USB device is one of an audio class type and a mass storage class type;
automatically reproducing, using the reproduction control means, data recorded in the USB device in response to determining that the USB device is of the audio class type, the automatically reproducing of the data being independent of a user input operation;
displaying, using the first display control means, on a display unit, provided in a position corresponding to the detected USB port, that the USB device connected to the detected USB port is in the course of data communication; and
displaying, using the second display control means, information on each of the USB devices connected to the USB ports on a display panel, the information being displayed including
whether each of the USB devices is one of the audio class type and the mass storage class type,
a device name of each of the USB devices,
a number of pieces of data recorded in each of the USB devices, and
a hierarchical structure of the data recorded in each of the USB devices.

9. A computer-readable storage medium including computer executable instructions, wherein the instructions, when executed by a computer in an information processing apparatus with a plurality of USB ports to which USB devices can be connected to, cause the computer to perform an information processing method, the information processing method comprising:
detecting the USB port of the plurality of USB ports to which the USB device that is in a course of data communication is connected;
determining whether the USB device is one of an audio class type and a mass storage class type;
automatically reproducing data recorded in the USB device in response to determining that the USB device is of the audio class type, the automatically reproducing of the data being independent of a user input operation;
displaying on a display unit, provided in a position corresponding to the detected USB port, that the USB device connected to the detected USB port is in the course of data communication; and
displaying information on each of the USB devices connected to the USB ports on a display panel, the information being displayed including
whether each of the USB devices is one of the audio class type and the mass storage class type,
a device name of each of the USB devices,
a number of pieces of data recorded in each of the USB devices, and
a hierarchical structure of the data recorded in each of the USB devices.

10. An information processing apparatus with a plurality of USB (universal serial bus) ports to which USB devices can be connected, the information processing apparatus comprising:
- a detection unit configured to detect the USB port of the plurality of USB ports to which the USB device that is in a course of data communication is connected, and to determine whether the USB device is one of an audio class type and a mass storage class type;
- a reproduction control unit configured to automatically reproduce data recorded in the USB device in response to the detection unit determining that the USB device is of the audio class type, the reproduction control unit automatically reproducing the data independent of a user input operation;
- a first display control unit configured to display on a display unit, provided in a position corresponding to the detected USB port, that the USB device connected to the detected USB port is in the course of data communication; and
- a second display control unit configured to display information on each of the USB devices connected to the USB ports on a display panel, the information being displayed including
  - whether each of the USB devices is one of the audio class type and the mass storage class type,
  - a device name of each of the USB devices,
  - a number of pieces of data recorded in each of the USB devices, and
  - a hierarchical structure of the data recorded in each of the USB devices.

11. The information processing apparatus according to claim 1, wherein the reproduction control means automatically reproduces the data recorded in the USB device in response to the detecting means determining that the USB device is of the audio class type and is not of the mass storage class type.

12. The information processing apparatus according to claim 1, wherein the audio class type and the mass storage class type are different.

13. The information processing apparatus according to claim 1, wherein the data reproduced by the reproduction control means in response to the detecting means determining that the USB device is of the audio class type, corresponds to music data.

* * * * *